Figure 1:
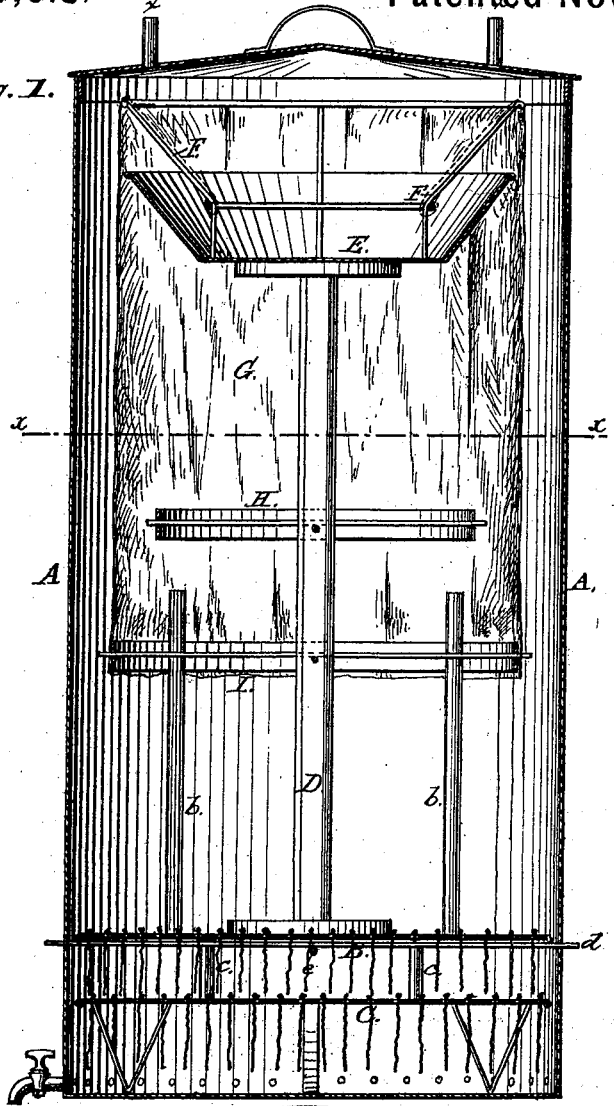
Figure 2:
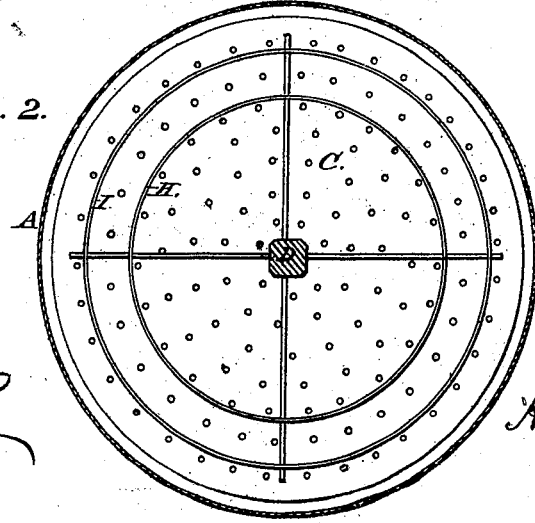

A. GRAHAM.
Apparatus for Making Vinegar and Aging Liquors.

No. 209,615. Patented Nov. 5, 1878.

Witnesses:

Inventor:

UNITED STATES PATENT OFFICE.

ARCHIBALD GRAHAM, OF FANCY HILL, VIRGINIA.

IMPROVEMENT IN APPARATUS FOR MAKING VINEGAR AND AGING LIQUORS.

Specification forming part of Letters Patent No. 209,615, dated November 5, 1878; application filed March 30, 1878.

*To all whom it may concern:*

Be it known that I, ARCHIBALD GRAHAM, of Fancy Hill, Rockbridge county, Virginia, have invented a new Mode of Making Vinegar and of Purifying and Aging Vinous and Spirituous Liquors; and declare the following to be an exact description of said invention, reference being had to the accompanying drawings, of which the following is a specification:

The apparatus consists of a cask, A, open at the top, with two false bottoms, B C, the lower false bottom about twelve inches above the bottom of the cask, the upper one about twelve inches above the lower false bottom, both provided with air-tubes $b$ $c$ and perforated with numerous small holes, to receive strings with knots, as in the old method. The cask is perforated around its sides with numerous air-holes and a hole for a faucet to discharge the liquid.

The upper false bottom is supported by two rods, $d$ $e$, crossing each other at right angles, and inserted through the sides of the cask. On the top of the upper false bottom is placed a stand, D, reaching nearly to the top of the cask, on which is placed a tub, E, to receive the liquids. Near the bottom of said tub iron rods F are so arranged as to secure the cloths G in the liquid. These cloths are so placed as to hang over the top of the tub, and are separated near the bottom by bands H I, so that the air can pass freely between and over them.

The cloths, by capillary attraction, draw the fluid from the tub, and as it passes over their entire length and breadth, it is exposed to the free action of the air. The liquid, after passing the whole length of these cloths, drops on and passes through a bed of beech shavings for making vinegar, and, for purifying spirituous and vinous liquors, on and through a bed of charcoal placed upon the upper false bottom.

The cask should be covered with some material with openings for the passage of the air, which enters at suitable openings below false bottom C, and escapes through openings $x$ at the top.

The operation of my apparatus is as follows: The false bottoms, provided with pendent strings held by knots, are first placed in the cask A, and upon them shavings or charcoal is introduced. The liquor is then introduced into the tub E, and will be drawn by capillary attraction therefrom by the cloths G, and slowly trickle through the shavings or charcoal, and, passing below the false bottoms, can be withdrawn through a suitable faucet in the side of the cask. The air circulates in the meantime all around and within the cloths, and assists in forming the vinegar, &c.

What I claim, and desire to secure by Letters Patent, is—

The cask A, having false bottoms B C and the standard D, provided with the rings H I and supporting the tub E, in combination with rods F and cloths G, substantially as described.

ARCHD. GRAHAM.

Witnesses:
R. R. WILLIAMSON,
A. MOORE.